(12) United States Patent
Kumfer et al.

(10) Patent No.: US 7,885,043 B2
(45) Date of Patent: Feb. 8, 2011

(54) REMOTE-OPERABLE MICRO-ELECTROMECHANICAL SYSTEM BASED OVER-CURRENT PROTECTION APPARATUS

(75) Inventors: Brent Charles Kumfer, Farmington, CT (US); William James Premerlani, Scotia, NY (US); Robert Joseph Caggiano, Wolcott, CT (US); Kanakasabapathi Subramanian, Clifton Park, NY (US); Christopher Fred Keimel, Schenectady, NY (US); Charles Stephan Pitzen, Avon, CT (US); David James Lesslie, Plainville, CT (US); Parag Thakre, Bangalore (IN)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 11/763,824

(22) Filed: Jun. 15, 2007

(65) Prior Publication Data

US 2008/0310056 A1 Dec. 18, 2008

(51) Int. Cl.
*H02H 3/00* (2006.01)
(52) U.S. Cl. .................. 361/2; 361/5; 361/64; 361/68; 361/81
(58) Field of Classification Search .................. 361/64, 361/68, 81, 2–5
See application file for complete search history.

(56) References Cited

U.S. PATENT DOCUMENTS

| | | | |
|---|---|---|---|
| 3,496,409 A | 2/1970 | Connell | ................... 315/36 |
| 4,384,289 A | 5/1983 | Stillwell et al. | |
| 4,723,187 A | 2/1988 | Howell | |
| 4,827,272 A | 5/1989 | Davis | |
| 4,847,780 A | 7/1989 | Gilker et al. | |
| 5,374,792 A | 12/1994 | Ghezzo et al. | |
| 5,426,360 A | 6/1995 | Maraio et al. | |
| 5,430,597 A | 7/1995 | Bagepalli et al. | .............. 361/93 |
| 5,454,904 A | 10/1995 | Ghezzo et al. | |
| 5,502,374 A | 3/1996 | Cota | |

(Continued)

FOREIGN PATENT DOCUMENTS

DE    19850397 A1    5/2000

(Continued)

OTHER PUBLICATIONS

"Power Circuit Breaker Using Micro-Mechanical Switches"; Authors: George G. Karady and Gerald Thomas Heydt; Int J. Critical Infrastructure, vol. 3, Nos. 1/2, 2007; pp. 88-100; XP008087882.

(Continued)

*Primary Examiner*—Jared J Fureman
*Assistant Examiner*—Christopher J Clark
(74) *Attorney, Agent, or Firm*—Cantor Colburn LLP

(57) ABSTRACT

The present invention provides a remote operable over-current protection apparatus. The apparatus includes control circuitry integrally arranged on a current path and a micro electromechanical system (MEMS) switch disposed on the current path, the MEMS switch responsive to the control circuitry to facilitate the interruption of an electrical current passing through the current path. The apparatus further includes a communication connection in signal connection with the control circuitry such that the control circuitry is responsive to a control signal on the communication connection to control a state of the MEMS switch.

19 Claims, 6 Drawing Sheets

U.S. PATENT DOCUMENTS

| | | | |
|---|---|---|---|
| 5,566,041 A * | 10/1996 | Rumfield | 361/115 |
| 5,889,643 A | 3/1999 | Elms | |
| 5,940,260 A | 8/1999 | Gelbien et al. | |
| 5,943,223 A | 8/1999 | Pond | |
| 5,973,896 A | 10/1999 | Hirsh et al. | |
| 6,054,659 A | 4/2000 | Lee et al. | |
| 6,275,366 B1 | 8/2001 | Gelbien et al. | |
| 6,563,683 B1 | 5/2003 | Strumpler | 361/93.1 |
| 6,738,246 B1 | 5/2004 | Strumpler | 361/93.1 |
| 6,904,471 B2 | 6/2005 | Boggs et al. | 710/8 |
| 7,450,362 B2 * | 11/2008 | Muller et al. | 361/95 |
| 2001/0014949 A1 | 8/2001 | Leblanc | |
| 2002/0008149 A1 | 1/2002 | Riley et al. | |
| 2002/0145841 A1 | 10/2002 | Williams et al. | |
| 2003/0050737 A1 | 3/2003 | Osann, Jr. | |
| 2003/0212473 A1 | 11/2003 | Vandevanter | |
| 2004/0032320 A1 | 2/2004 | Zalitzky et al. | |
| 2004/0113713 A1 | 6/2004 | Zipper et al. | |
| 2004/0263125 A1 | 12/2004 | Kanno et al. | |
| 2005/0085928 A1 | 4/2005 | Shani | 700/18 |
| 2005/0248340 A1 | 11/2005 | Berkcan et al. | 324/259 |
| 2005/0270014 A1 | 12/2005 | Zribi et al. | |
| 2006/0121785 A1 | 6/2006 | Caggiano et al. | |
| 2006/0187688 A1 | 8/2006 | Tsuruya | 363/56.12 |
| 2006/0202933 A1 | 9/2006 | Pasch et al. | 345/94 |
| 2007/0013357 A1 | 1/2007 | Huang et al. | 323/318 |
| 2007/0057746 A1 | 3/2007 | Rubel | |
| 2007/0142938 A1 | 6/2007 | Huang | 700/40 |
| 2007/0173960 A1 | 7/2007 | Kumar | 700/40 |

FOREIGN PATENT DOCUMENTS

| | | | |
|---|---|---|---|
| DE | 19927762 A1 | 1/2001 | |
| EP | 0072422 A1 | 2/1983 | |
| EP | 0233756 A1 | 8/1987 | |
| EP | 0774822 A1 | 5/1997 | |
| EP | 1255268 A1 | 11/2002 | |
| EP | 1610142 A1 | 12/2005 | |
| EP | 1643324 A2 | 4/2006 | |
| EP | 1681694 A1 | 7/2006 | |
| GB | 2123627 A | 2/1984 | |
| WO | 9946606 A2 | 9/1999 | |
| WO | 0004392 A1 | 1/2000 | |
| WO | 2006078944 A2 | 7/2006 | |
| WO | 2006100192 A1 | 9/2006 | |

OTHER PUBLICATIONS

"MEMS Based Electronic Circuit Breaker as a Possible Component for and Electrical Ship", Authors: George G. Karady and Gerald T. Heydt; IEEE Electric Ship Technologies Symposium, 2005; pp. 214-218; XP-002468154.

"Advanced MEMS for High Power Integrated Distribution Systems"; Authors: Rahim Kasim, Bruce C. Kim and Josef Drobnik; IEEE Computer; Proceedings of the International Conference on MEMS, NANO and Smart Systems, 2005; pp. 1-6.

PCT International Search Report; International Application No. PCT/US2007/014379; International Filing Date Jun. 20, 2007; Date of Mailing Feb. 11, 2008.

PCT International Search Report; International Application No. PCT/US2007/071644; International Filing Date Jun. 20, 2007; Date of Mailing Feb. 13, 2008.

PCT International Search Report; International Application No. PCT/US2007/071624; International Filing Date Jun. 20, 2007; Date of Mailing Feb. 18, 2008.

PCT International Search Report; International Application No. PCT/US2007/071627; International Filing Date Jun. 20, 2007; Date of Mailing Feb. 29, 2008.

PCT International Search Report; International Application No. PCT/US2007/071630; International Filing Date Jun. 20, 2007; Date of Mailing Mar. 7, 2008.

PCT Written Opinion of the International Searching Authority; International Application No. PCT/US2007/071630; International Filing Date Jun. 20, 2007; Date of Mailing Mar. 7, 2008.

PCT International Search Report; International Application No. PCT/US2007/071632; International Filing Date Jun. 20, 2007; Date of Mailing Feb. 29, 2008.

PCT Written Opinion of the International Searching Authority; International Application No. PCT/US2007/071632; International Filing Date Jun. 20, 2007; Date of Mailing Feb. 29, 2008.

PCT International Search Report; International Application No. PCT/US2007/014363; International Filing Date Jun. 20, 2007; Date of Mailing Mar. 4, 2008.

PCT International Search Report; International Application No. PCT/US2007/071656; International Filing Date Jun. 20, 2007; Date of Mailing Mar. 12, 2008.

PCT International Search Report; International Application No. PCT/US2007/071654; International Filing Date Jun. 20, 2007; Date of Mailing Mar. 13, 2008.

PCT International Search Report; International Application No. PCT/US2007/014362; International Filing Date Jun. 20, 2007; Date of Mailing Mar. 20, 2008.

PCT International Search Report; International Application No. PCT/US2007/071643; International Filing Date Jun. 20, 2007; Date of Mailing Feb. 8, 2008.

PCT Written Opinion of the International Searching Authority; International Application No. PCT/US2007/071643; International Filing Date Jun. 20, 2007; Date of Mailing Feb. 8, 2008.

George G. Karady and G.T. Heydt, "Novel Concept for Medium Voltage Circuit Breakers Using Microswitches." IEEE Transactions on Power Delivery, vol. 21, No. 1., Jan. 2006, pp. 536-537.

USPTO Office Action dated Oct. 17, 2008; Filing Date: Jun. 19, 2007; First Named Inventor: William James Premerlani; Confirmation No. 6421.

USPTO Office Action dated Oct. 24, 2008; Filing Date: Jun. 15, 2007; First Named Inventor: William James Permerlani; Confirmation No. 4167.

USPTO Office Action dated Oct. 28, 2008; Filing Date: Jun. 8, 2007; First Named Inventor: Cecil Rivers, Jr.; Confirmation No. 7895.

European Search Report for European Application No. 07110554.8; European Filing Date of Oct. 19, 2007; Mailing Date of Oct. 30, 2007; (6 pgs).

* cited by examiner

US 7,885,043 B2

REMOTE-OPERABLE MICRO-ELECTROMECHANICAL SYSTEM BASED OVER-CURRENT PROTECTION APPARATUS

BACKGROUND OF THE INVENTION

Embodiments of the invention relate generally to a switching device for switching off a current in a current path, and more particularly to micro-electromechanical system based switching devices.

A circuit breaker is an electrical device designed to protect electrical equipment from damage caused by faults in the circuit. Traditionally, most conventional circuit breakers include bulky electromechanical switches. Unfortunately, these conventional circuit breakers are large in size thereby necessitating use of a large force to activate the switching mechanism. Therefore, remote operability of conventional circuit breakers includes large additional mechanical systems capable of producing the large force for activation. Additionally, the switches of these circuit breakers generally operate at relatively slow speeds. Further, these circuit breakers are disadvantageously complex to build, and thus expensive to fabricate. In addition, when contacts of a switching mechanism within a conventional circuit breaker are physically separated, an arc is typically formed between the contacts and continues to carry current until the current in the circuit ceases. Moreover, energy associated with the arc is generally undesirable to both equipment and personnel.

A contactor is an electrical device that is designed to switch an electrical load ON and OFF upon command. Traditionally, electromechanical contactors are employed in control gear, where the electromechanical contactors are capable of handling switching currents up to their interrupting capacity. Electromechanical contactors may also find application in power systems for switching currents. However, fault currents in power systems are typically greater than the interrupting capacity of the electromechanical contactors. Accordingly, to employ electromechanical contactors in power system applications it may be desirable to protect the contactor from damage by backing it up with a series device that is sufficiently fast acting to interrupt fault currents prior to the contactor opening at all values of current above the interrupting capacity of the contactor.

Previously conceived solutions to facilitate use of contactors in power systems have include vacuum contactors, vacuum interrupters and air break contactors. Unfortunately, contactors such as vacuum contactors do not lend themselves to easy visual inspection as the contactor tips are encapsulated in a sealed, evacuated enclosure. Further, while the vacuum contactors are well suited for handling the switching of large motors, transformers and capacitors, they are known to cause damaging transient over voltages, particularly when the load is switched off.

Further, electromechanical contactors generally use mechanical switches. However, as these mechanical switches tend to switch at a relatively slow speed predictive techniques are required in order to estimate occurrence of a zero crossing, often tens of milliseconds before the switching event is to occur. Such zero crossing prediction is prone to error as many transients may occur in this time.

As an alternative to slow mechanical and electromechanical switches, fast solid-state switches have been employed in high speed switching applications. As will be appreciated, these solid-state switches switch between a conducting state and a non-conducting state through controlled application of a voltage or bias. For example, by reverse biasing a solid-state switch, the switch may be transitioned into a non-conducting state. However, because solid-state switches do not create a physical gap between contacts when they are switched into a non-conducing state, they experience leakage current. Further, due to internal resistances, when solid-state switches operate in a conducting state, they experience a voltage drop. Both the voltage drop and leakage current contribute to the generation of excess heat under normal operating circumstances, which may be detrimental to switch performance and life. Moreover, due at least in part to the inherent leakage current associated with solid-state switches, their use in circuit breaker applications is not possible.

BRIEF DESCRIPTION OF THE INVENTION

Exemplary embodiments of the present invention include a remote operable over-current protection apparatus. The apparatus may include control circuitry integrally arranged on a current path and a micro electromechanical system (MEMS) switch disposed on the current path, the MEMS switch responsive to the control circuitry to facilitate the interruption of an electrical current passing through the current path. The apparatus may further include a communication connection in signal connection with the control circuitry such that the control circuitry is responsive to a control signal on the communication connection to control a state of the MEMS switch.

Another exemplary embodiment of the present invention includes a method of remote over-current protection of a current path. The method may include measuring electrical current via control circuitry arranged integrally with the current path, facilitating interrupting of the electrical current via a MEMS switch responsive to the control circuitry, the MEMS switch disposed on the current path, and changing a state of the MEMS switch based on a control signal communicated to the control circuitry.

BRIEF DESCRIPTION OF THE DRAWINGS

These and other features, aspects, and advantages of the present invention will become better understood if the following detailed description is read with reference to the accompanying drawings in which like characters represent like parts throughout the drawings, wherein.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Figure 1:
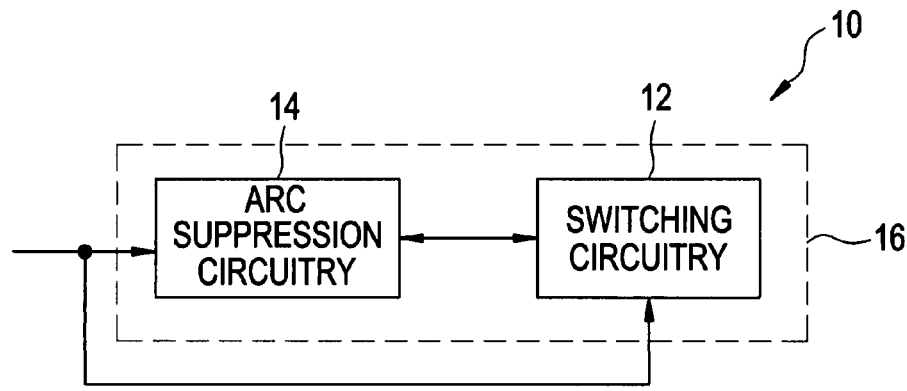
FIG. 1 is a block diagram of an exemplary MEMS based switching system in accordance with an embodiment of the invention.

FIG. 1 illustrates a block diagram of an exemplary arc-less MEMS based switching system 10, in accordance with aspects of the present invention. Presently, MEMSs generally refers to micron-scale structures that, for example, can integrate a multiplicity of functionally distinct elements. Such elements including, but not being limited to, mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, that is, structures that may be smaller than 100 nanometers in size. Accordingly, even though example embodiments described throughout this document may refer to MEMS-based switching devices, it is submitted that the inventive aspects of the present invention should be broadly construed and should not be limited to micron-sized devices.

As illustrated in FIG. 1, the arc-less MEMS based switching system 10 is shown as including MEMS based switching circuitry 12 and arc suppression circuitry 14, where the arc suppression circuitry 14 (alternatively referred to Hybrid Arc-less Limiting Technology (HALT)), is operatively coupled to the MEMS based switching circuitry 12. Within exemplary embodiments of the present invention, the MEMS based switching circuitry 12 may be integrated in its entirety with the arc suppression circuitry 14 in a single package 16. In further exemplary embodiments, only specific portions or components of the MEMS based switching circuitry 12 may be integrated in conjunction with the arc suppression circuitry 14.

In a presently contemplated configuration as will be described in greater detail with reference to FIG. 2, the MEMS based switching circuitry 12 may include one or more MEMS switches. Additionally, the arc suppression circuitry 14 may include a balanced diode bridge and a pulse circuit. Further, the arc suppression circuitry 14 may be configured to facilitate suppression of an arc formation between contacts of the one or more MEMS switches. It may be noted that the arc suppression circuitry 14 may be configured to facilitate suppression of an arc formation in response to an alternating current (AC) or a direct current (DC).

Figure 2:
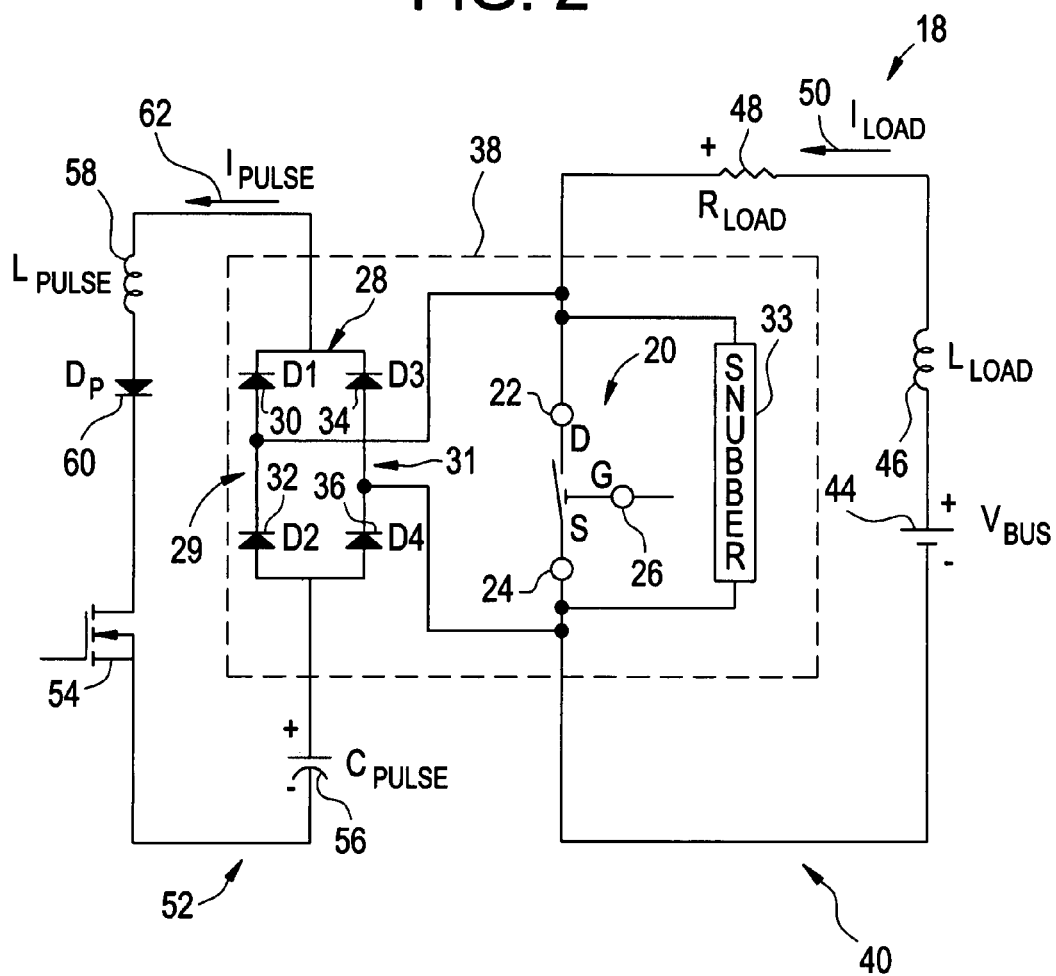
FIG. 2 is schematic diagram illustrating the exemplary MEMS based switching system depicted in FIG. 1.

Turning now to FIG. 2, a schematic diagram 18 of the exemplary arc-less MEMS based switching system depicted in FIG. 1 is illustrated in accordance with an embodiment. As noted with reference to FIG. 1, the MEMS based switching circuitry 12 may include one or more MEMS switches. In the illustrated exemplary embodiment, a first MEMS switch 20 is depicted as having a first contact 22, a second contact 24 and a third contact 26. In one embodiment, the first contact 22 may be configured as a drain, the second contact 24 may be configured as a source and the third contact 26 may be configured as a gate. Further, as illustrated in FIG. 2, a voltage snubber circuit 33 may be coupled in parallel with the MEMS switch 20 and configured to limit voltage overshoot during fast contact separation as will be explained in greater detail hereinafter. In further embodiments, the snubber circuit 33 may include a snubber capacitor (see 76, FIG. 4) coupled in series with a snubber resistor (see FIG. 4, reference number 78). The snubber capacitor may facilitate improvement in transient voltage sharing during the sequencing of the opening of the MEMS switch 20. Additionally, the snubber resistor may suppress any pulse of current generated by the snubber capacitor during closing operation of the MEMS switch 20. In yet further embodiments, the voltage snubber circuit 33 may include a metal oxide varistor (MOV) (not shown).

In accordance with further aspects of the present technique, a load circuit 40 may be coupled in series with the first MEMS switch 20. The load circuit 40 may include a voltage source $V_{BUS}$ 44. In addition, the load circuit 40 may also include a load inductance 46 $L_{LOAD}$, where the load inductance $L_{LOAD}$ 46 is representative of a combined load inductance and a bus inductance viewed by the load circuit 40. The load circuit 40 may also include a load resistance $R_{LOAD}$ 48 representative of a combined load resistance viewed by the load circuit 40. Reference numeral 50 is representative of a load circuit current $I_{LOAD}$ that may flow through the load circuit 40 and the first MEMS switch 20.

As noted with reference to FIG. 1, the arc suppression circuitry 14 may include a balanced diode bridge. In the illustrated embodiment, a balanced diode bridge 28 is depicted as having a first branch 29 and a second branch 31. As used herein, the term "balanced diode bridge" is used to represent a diode bridge that is configured in such a manner that voltage drops across both the first and second branches 29, 31 are substantially equal. The first branch 29 of the balanced diode bridge 28 may include a first diode D1 30 and a second diode D2 32 coupled together to form a first series circuit. In a similar fashion, the second branch 31 of the balanced diode bridge 28 may include a third diode D3 34 and a fourth diode D4 36 operatively coupled together to form a second series circuit.

In an exemplary embodiment, the first MEMS switch 20 may be coupled in parallel across midpoints of the balanced diode bridge 28. The midpoints of the balanced diode bridge may include a first midpoint located between the first and second diodes 30, 32 and a second midpoint located between the third and fourth diodes 34, 36. Further, the first MEMS switch 20 and the balanced diode bridge 28 may be tightly packaged to facilitate minimization of parasitic inductance caused by the balanced diode bridge 28 and in particular, the connections to the MEMS switch 20. It must be noted that, in accordance with exemplary aspects of the present technique, the first MEMS switch 20 and the balanced diode bridge 28 are positioned relative to one another such that the inherent inductance between the first MEMS switch 20 and the balanced diode bridge 28 produces a di/dt voltage less than a few percent of the voltage across the drain 22 and source 24 of the MEMS switch 20 when carrying a transfer of the load current to the diode bridge 28 during the MEMS switch 20 turn-off which will be described in greater detail hereinafter. In further embodiments, the first MEMS switch 20 may be integrated with the balanced diode bridge 28 in a single package 38 or optionally within the same die with the intention of minimizing the inductance interconnecting the MEMS switch 20 and the diode bridge 28.

Additionally, the arc suppression circuitry 14 may include a pulse circuit 52 operatively coupled in association with the balanced diode bridge 28. The pulse circuit 52 may be configured to detect a switch condition and initiate opening of the MEMS switch 20 responsive to the switch condition. As used herein, the term "switch condition" refers to a condition that triggers changing a present operating state of the MEMS switch 20. For example, the switch condition may result in changing a first closed state of the MEMS switch 20 to a second open state or a first open state of the MEMS switch 20 to a second closed state. A switch condition may occur in response to a number of actions including but not limited to a circuit fault or switch ON/OFF request.

The pulse circuit 52 may include a pulse switch 54 and a pulse capacitor $C_{PULSE}$ 56 series coupled to the pulse switch 54. Further, the pulse circuit may also include a pulse inductance $L_{PULSE}$ 58 and a first diode $D_p$ 60 coupled in series with the pulse switch 54. The pulse inductance $L_{PULSE}$ 58, the diode $D_p$ 60, the pulse switch 54 and the pulse capacitor $C_{PULSE}$ 56 may be coupled in series to form a first branch of the pulse circuit 52, where the components of the first branch may be configured to facilitate pulse current shaping and timing. Also, reference numeral 62 is representative of a pulse circuit current $I_{PULSE}$ that may flow through the pulse circuit 52.

In accordance with aspects of the present invention, the MEMS switch 20 may be rapidly switched (for example, on the order of picoseconds or nanoseconds) from a first closed state to a second open state while carrying a current albeit at a near-zero voltage. This may be achieved through the combined operation of the load circuit 40, and pulse circuit 52 including the balanced diode bridge 28 coupled in parallel across contacts of the MEMS switch 20.

Figure 3:
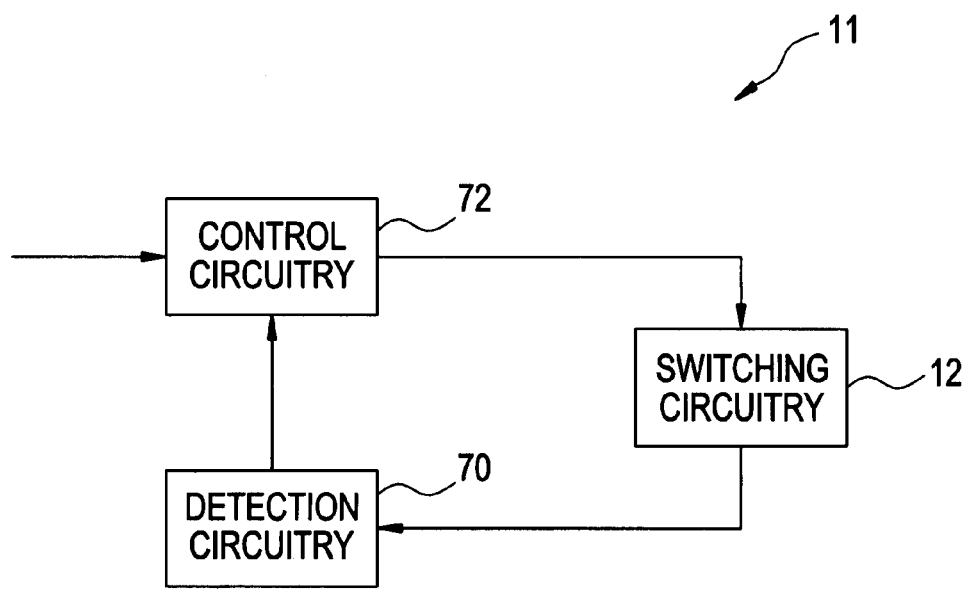
FIG. 3 is a block diagram of an exemplary MEMS based switching system in accordance with an embodiment of the invention and alternative to the system depicted in FIG. 1.

Reference is now made to FIG. 3, which illustrates a block diagram of an exemplary soft switching system 11, in accordance with aspects of the present invention. As illustrated in FIG. 3, the soft switching system 11 includes switching circuitry 12, detection circuitry 70, and control circuitry 72 operatively coupled together. The detection circuitry 70 may be coupled to the switching circuitry 12 and configured to detect an occurrence of a zero crossing of an alternating source voltage in a load circuit (hereinafter "source voltage") or an alternating current in the load circuit (hereinafter referred to as "load circuit current"). The control circuitry 72 may be coupled to the switching circuitry 12 and the detection circuitry 70, and may be configured to facilitate arc-less switching of one or more switches in the switching circuitry 12 responsive to a detected zero crossing of the alternating source voltage or the alternating load circuit current. In one embodiment, the control circuitry 72 may be configured to facilitate arc-less switching of one or more MEMS switches comprising at least part of the switching circuitry 12.

In accordance with one aspect of the invention, the soft switching system 11 may be configured to perform soft or point-on-wave (PoW) switching whereby one or more MEMS switches in the switching circuitry 12 may be closed at a time when the voltage across the switching circuitry 12 is at or very close to zero and opened at a time when the current through the switching circuitry 12 is at or close to zero. By closing the switches at a time when the voltage across the switching circuitry 12 is at or very close to zero, pre-strike arcing can be avoided by keeping the electric field low between the contacts of the one or more MEMS switches as they close; even if multiple switches do not all close at the same time. Similarly, by opening the switches at a time when the current through the switching circuitry 12 is at or close to zero, the soft switching system 11 can be designed so that the current in the last switch to open in the switching circuitry 12 falls within the design capability of the switch. As mentioned above, the control circuitry 72 may be configured to synchronize the opening and closing of the one or more MEMS switches of the switching circuitry 12 with the occurrence of a zero crossing of an alternating source voltage or an alternating load circuit current.

Figure 4:
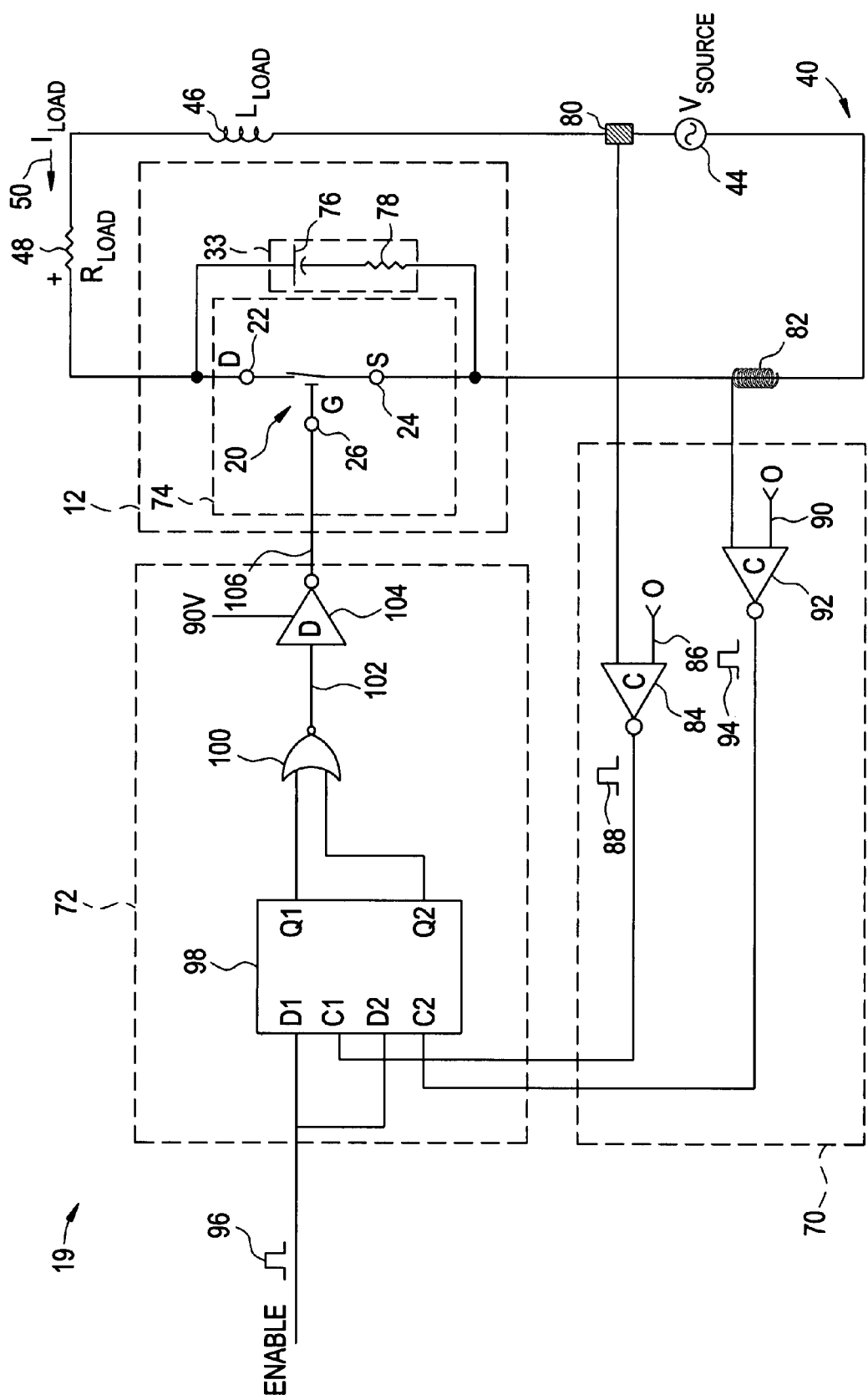
FIG. 4 is a schematic diagram illustrating the exemplary MEMS based switching system depicted in FIG. 3.

Turning to FIG. 4, a schematic diagram 19 of one embodiment of the soft switching system 11 of FIG. 3 is illustrated. In accordance with the illustrated embodiment, the schematic diagram 19 includes one example of the switching circuitry 12, the detection circuitry 70 and the control circuitry 72.

Although for the purposes of description, FIG. 4 illustrates only a single MEMS switch 20 in switching circuitry 12, the switching circuitry 12 may nonetheless include multiple MEMS switches depending upon, for example, the current and voltage handling requirements of the soft switching system 11. In an exemplary embodiment, the switching circuitry 12 may include a switch module including multiple MEMS switches coupled together in a parallel configuration to divide the current amongst the MEMS switches. In a further exemplary embodiment, the switching circuitry 12 may include an array of MEMS switches coupled in a series configuration to divide the voltage amongst the MEMS switches. In a yet further exemplary embodiment, the switching circuitry 12 may include an array of MEMS switch modules coupled together in a series configuration to concurrently divide the voltage amongst the MEMS switch modules and divide the current amongst the MEMS switches in each module. Furthermore, the one or more MEMS switches of the switching circuitry 12 may be integrated into a single package 74.

The exemplary MEMS switch 20 may include three contacts. In an exemplary embodiment, a first contact may be configured as a drain 22, a second contact may be configured as a source 24, and the third contact may be configured as a gate 26. In one embodiment, the control circuitry 72 may be coupled to the gate contact 26 to facilitate switching a current state of the MEMS switch 20. Also, in additional exemplary embodiments damping circuitry (snubber circuit) 33 may be coupled in parallel with the MEMS switch 20 to delay appearance of voltage across the MEMS switch 20. As illustrated, the damping circuitry 33 may include a snubber capacitor 76 coupled in series with a snubber resistor 78.

The MEMS switch 20 may be coupled in series with a load circuit 40, as further illustrated in FIG. 4. In a presently contemplated configuration, the load circuit 40 may include a voltage source $V_{SOURCE}$ 44, and may possess a representative load inductance $L_{LOAD}$ 46 and a load resistance $R_{LOAD}$ 48. In one embodiment, the voltage source $V_{SOURCE}$ 44 (also referred to as an AC voltage source) may be configured to generate the alternating source voltage and the alternating load current $I_{LOAD}$ 50.

As previously noted, the detection circuitry 70 may be configured to detect occurrence of a zero crossing of the alternating source voltage or the alternating load current $I_{LOAD}$ 50 in the load circuit 40. The alternating source voltage may be sensed via the voltage sensing circuitry 80 and the alternating load current $I_{LOAD}$ 50 may be sensed via the current sensing circuitry 82. The alternating source voltage and the alternating load current may be sensed continuously or at discrete periods for example.

A zero crossing of the source voltage may be detected through, for example, use of a comparator such as the illustrated zero voltage comparator 84. The voltage sensed by the voltage sensing circuitry 80 and a zero voltage reference 86 may be employed as inputs to the zero voltage comparator 84. In turn, an output signal 88 representative of a zero crossing of the source voltage of the load circuit 40 may be generated. Similarly, a zero crossing of the load current $I_{LOAD}$ 50 may also be detected through use of a comparator such as the illustrated zero current comparator 92. The current sensed by the current sensing circuitry 82 and a zero current reference 90 may be employed as inputs to the zero current comparator 92. In turn, an output signal 94 representative of a zero crossing of the load current $I_{LOAD}$ 50 may be generated.

The control circuitry 72, may in turn utilize the output signals 88 and 94 to determine when to change (for example, open or close) the current operating state of the MEMS switch 20 (or array of MEMS switches). More specifically, the control circuitry 72 may be configured to facilitate opening of the MEMS switch 20 in an arc-less manner to interrupt or open the load circuit 40 responsive to a detected zero crossing of the alternating load current $I_{LOAD}$ 50. Additionally, the control circuitry 72 may be configured to facilitate closing of the MEMS switch 20 in an arc-less manner to complete the load circuit 40 responsive to a detected zero crossing of the alternating source voltage.

The control circuitry 72 may determine whether to switch the present operating state of the MEMS switch 20 to a second operating state based at least in part upon a state of an Enable signal 96. The Enable signal 96 may be generated as a result of a power off command in a contactor application, for example. Further, the Enable signal 96 and the output signals 88 and 94 may be used as input signals to a dual D flip-flop 98 as shown. These signals may be used to close the MEMS switch 20 at a first source voltage zero after the Enable signal 96 is made active (for example, rising edge triggered), and to open the MEMS switch 20 at the first load current zero after the Enable signal 96 is deactivated (for example, falling edge triggered). With respect to the illustrated schematic diagram 19 of FIG. 4, every time the Enable signal 96 is active (either high or low depending upon the specific implementation) and either output signal 88 or 94 indicates a sensed voltage or current zero, a trigger signal 172 may be generated. Additionally, the trigger signal 172 may be generated via a NOR gate 100. The trigger signal 102 may in turn be passed through a MEMS gate driver 104 to generate a gate activation signal 106 which may be used to apply a control voltage to the gate 26 of the MEMS switch 20 (or gates in the case of a MEMS array).

As previously noted, in order to achieve a desirable current rating for a particular application, a plurality of MEMS switches may be operatively coupled in parallel (for example, to form a switch module) in lieu of a single MEMS switch. The combined capabilities of the MEMS switches may be designed to adequately carry the continuous and transient overload current levels that may be experienced by the load circuit. For example, with a 10-amp RMS motor contactor with a 6× transient overload, there should be enough switches coupled in parallel to carry 60 amps RMS for 10 seconds. Using point-on-wave switching to switch the MEMS switches within 5 microseconds of reaching current zero, there will be 160 milliamps instantaneous, flowing at contact opening. Thus, for that application, each MEMS switch should be capable of "warm-switching" 160 milliamps, and enough of them should be placed in parallel to carry 60 amps. On the other hand, a single MEMS switch should be capable of interrupting the amount of current that will be flowing at the moment of switching.

Figure 5:
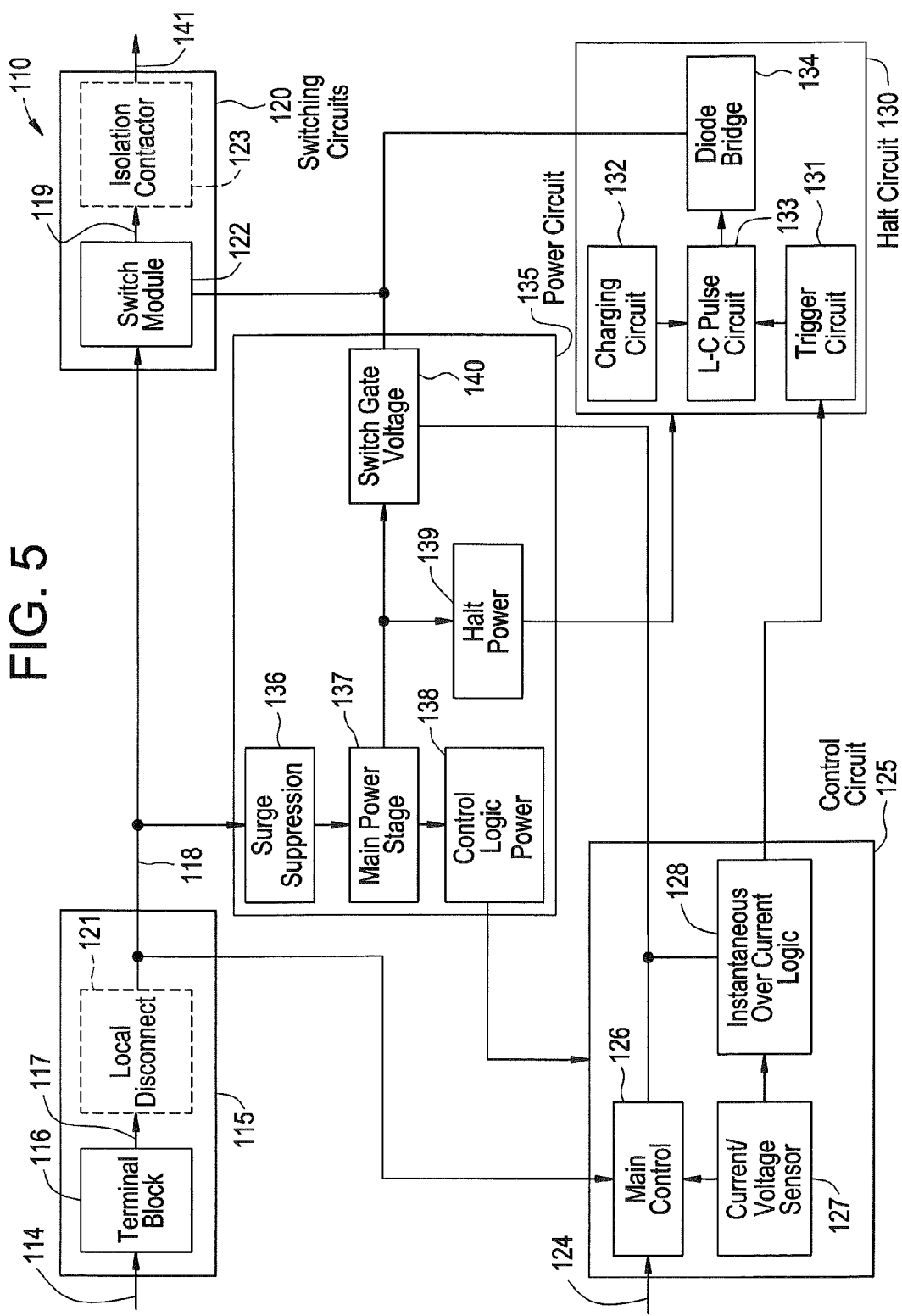
FIG. 5 is a block diagram of an exemplary remote operable over-current protection apparatus in accordance with an embodiment of the present invention.

FIG. 5 depicts a block diagram of a remote operable over-current protection apparatus 110 in accordance with embodiments of the present invention. The apparatus 110 may receive user control inputs at the user interface 115. User control inputs may be in the form of input from a trip adjustment potentiometer, an electrical signal from a human interface (for example, from a push-button interface), and/or external control equipment input/signals. User control inputs may be used to control MEMS switching as well as provide adjustability with regards to trip-time curves.

As further illustrated in FIG. 5, three-phase power inputs 114 are received at a terminal block 116 of the user interface 115. Line power input 114 is fed to the terminal block 116 and then respectively through to the power circuit 135 and the switching circuits 120 (for example, through power connection 118). Alternatively, a local disconnect 121 may be included after terminal block 116 to allow disconnection of three-phase power in the apparatus 110 for maintenance or situations dictating a lack of power in the apparatus. The power circuit 135 performs basic functions to provide power for the additional circuits, such as transient suppression, voltage scaling and isolation, and electromagnetic interference (EMI) filtering.

The apparatus 110 further includes control circuit 125. Control circuit 125 may provide timed based decisions (for example, setting the trip-time curve for timed over-currents (functionality may be included in main control 126), allowing programmability or adjustability of the apparatus 110, controlling the closing/re-closing of specified logic (126, 128), etc). FIG. 5 further illustrates HALT circuit 130. For example, HALT circuit 130 may be similar or substantially similar to arc-suppression circuitry 14 of FIG. 1. HALT circuit 130 provides voltage and current measurements, implements logic for instantaneous over-current protection operations, and provides energy diversion circuits utilized for switching operations. As illustrated, HALT circuit 130 may include charging circuit 132, pulse circuit 133, and diode bridge 134 (for example, may be similar to the "balanced diode bridge" described in detail hereinbefore). Additionally, the HALT circuit 130 is similar in configuration and operation to the pulse circuit 52 as described hereinbefore.

Further illustrated in FIG. 5 are switching circuits 120. The switching circuits 120 may include a plurality of switches (such as, MEMS switches, contactor switches, for example). However, as illustrated, switching circuits 120 include the switch module 122. The switch module 122 is similar in configuration and operation to the MEMS switch 20 as described above. The switching circuits 120 may also include isolation contactor 123. Isolation contactor 123 may provide air-gap isolation of the current path including line 119 to line 141. Such may be alternatively termed "final isolation" or "safety isolation". It is noted that the inclusion of a final isolation is optional. Hereinafter, a more detailed description of the operation of the remote operable over-current protection apparatus 110 is given.

Power for the apparatus 110 is derived from three-phase power fed to the apparatus 110 (for example, line power from terminal block 116). Power is drawn from a phase-to-phase differential of the input feed 114 (for example, line 118 is fed from line 114 through terminal block 116 and/or local disconnect 121). The drawn power is fed through a surge suppression component 136. A main power stage component 137 distributes power at various voltages in order to feed the control logic power stage 138, HALT power stage 139, and the MEMS switch gate voltage stage 140.

With regards to triggering operation and MEMS switch operation, a current and voltage sensor 127 feeds the instantaneous over-current control logic and main control logic 128 and 126, respectively, which in turn controls the MEMS switch gate voltage 140 and the triggering circuit 131 of the HALT circuit 130.

The current/voltage sensor 127 of the apparatus 110 monitors either a current level or a voltage level within a system. As implemented, the current/voltage detector may determine if the level of the current/voltage has varied from a predetermined or desired value. It should be noted that this may be any value, either set or configured for the apparatus 110. In the event that the monitored current/voltage levels do vary from a predetermined or desired value, a fault signal is generated at the instantaneous over-current logic 128 to indicate that a system determined variance in current/voltage level has been detected. Thereafter, the fault signal is delivered to the trigger circuit 131, and the trigger circuit initiates an over-current protection pulsing operation at the HALT circuit 130. The pulsing operation involves the activation of the pulse circuit 133, the activation of which results in the closing of the LC pulse circuit. If the LC pulse circuit 133 has been closed, the capacitance of the pulse circuit discharges through the balanced diode bridge 134. The pulse current through the diode bridge 134 creates a resulting short across the MEMS array switches of the switching module 122 and diverts energy into the diode bridge from the MEMS array (see FIGS. 2 and 5). Therefore, under the protective pulse operation, the MEMS switches of the switch module 122 may be opened without arcing.

Further illustrated in FIG. 5 is communication connection 124. The communication connection 124 is in signal connection with the control circuit 125. Therefore, the control circuit 125 is responsive to control signals on the communication connection to control a state of the MEMS switch. For example, a logic level signal may be placed on the communication connection 124. The logic level signal may activate operational states of the MEMS switch(es) of switch module 122 through control circuit 125. Therefore, remote operability of the MEMS switches is possible by a remote control signal originating from a location spatially displaced with respect to the MEMS switches and being directed to the communication connection. As such, logic level signals may be transmitted through communication connection 124 to set, reset, unset, for example, the over-current protection apparatus 110. It is noted that although the previous operations have been described with reference to a logic level signal, other suitable signals and/or levels of signals are also applicable to example embodiments of the present invention. Further description of the remote operability of apparatus 110 is given below with reference to FIG. 6.

Figure 6:
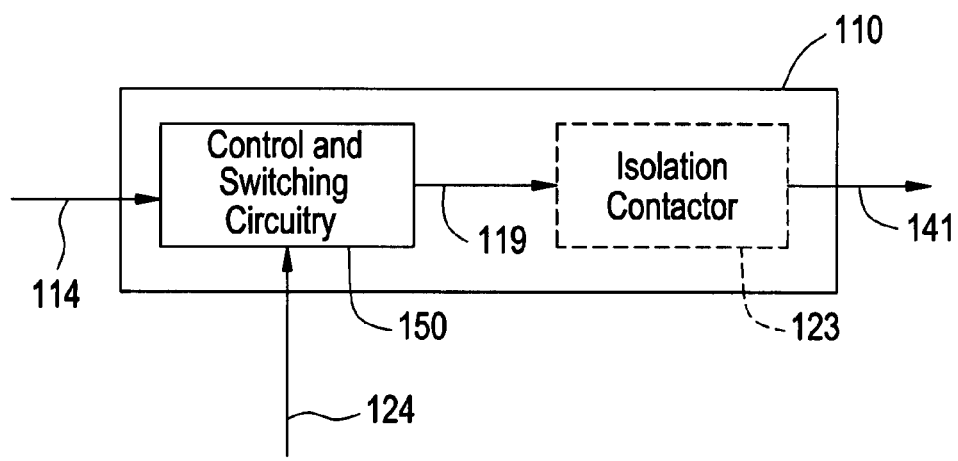
FIG. 6 is a block diagram of an exemplary of an exemplary remote operable over-current protection apparatus in accordance with an embodiment of the present invention.

FIG. 6 depicts circuitry 150 operatively connected to communication connection 124. Circuitry 150 may be substantially similar to the control and switch circuitry 72 and 12, and/or 125 and 120 described hereinbefore. Therefore, circuitry 150 is configured to measure parameters related to an electrical current passing through the current path 114 to 141, and to compare the measured parameters with those corresponding to one or more defined trip events, such as an amount of electrical current and time of an over-current event for example. In response to a parameter of electrical current passing through the conduction path 114 to 141, such as an instantaneous increase in electrical current of a magnitude great enough to indicate a short circuit, the circuitry 150 may initiate interruption of the current path 114 to 141. For example, interruption may be substantially similar to the operations described above with reference to FIGS. 1-4. Additionally, in response to a parameter such as a defined duration of increase in the electrical current of a magnitude less than a short circuit, which can be indicative of a defined timed over-current fault, the circuitry 150 may likewise initiate interruption of the electrical current on the current path 114 to 141. Subsequent to the interruption, circuitry 150 may be reset through a signal on communication connection 124. Similarly, circuitry 150 may be tripped through a signal on communication connection 124. Therefore, circuitry 150 provides remote operability of over-current protection. Further illustrated in FIG. 6 is isolation contactor 123. Such a contactor is optional and only included for illustrative purposes.

Figure 7:
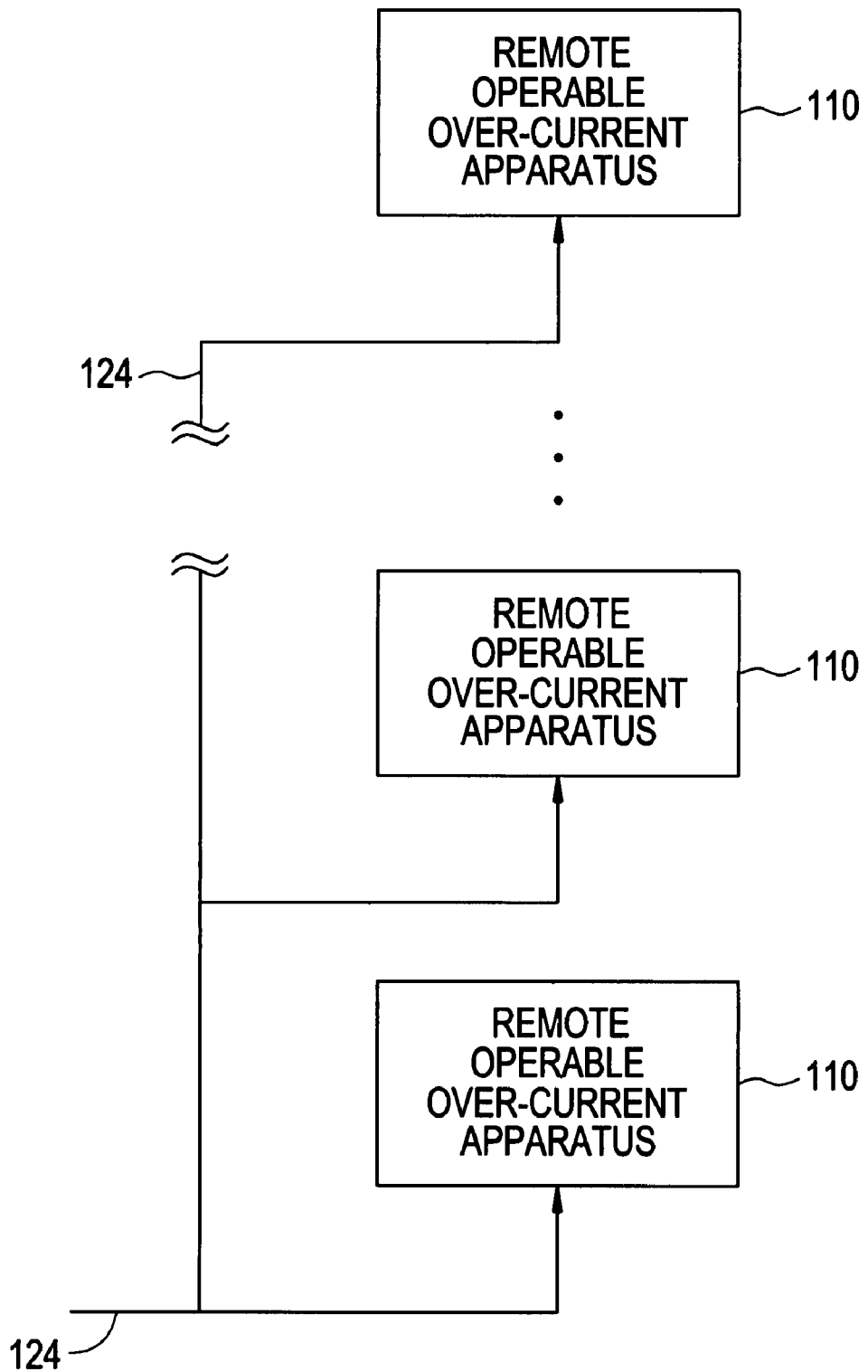
FIG. 7 is a block diagram of an exemplary system including a plurality of remote-operable over-current protection apparatuses in accordance with an embodiment of the present invention.

It should be understood that example embodiments of the present invention are not limited to a single remote operable apparatus. In some example embodiments, a plurality of over-current protection apparatuses are included in a system. FIG. 7 is a block diagram of an exemplary system including a plurality of remote-operable over-current protection apparatuses in accordance with an embodiment of the present invention.

As illustrated in FIG. 7, a plurality of remote operable over-current protection apparatuses 110 are interconnected via communication connection 124. Each apparatus 110 may control interruption of a different power line feed, or even the same power feed. As illustrated, any number of apparatuses 110 may be included. Furthermore, although FIG. 7 depicts one communication connection 124, it will be understood that any number of communication connections may be used to promote individual or set operation of apparatuses 110. Therefore, according to example embodiments of the present invention, a plurality of over-current protection apparatuses may be controlled remotely.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A remote operable over-current protection system, comprising:
    a plurality of remote operable over-current protection apparatuses, wherein each of the plurality of remote operable over-current protection apparatuses includes:
    control circuitry integrally arranged on a current path configured to receive an enable logic signal in the form of a logical-high or a logical-low voltage signal, and configured to provide a gate activation signal;
    a micro electromechanical system (MEMS) switch disposed on the current path, the MEMS switch comprising a first contact configured as a drain, a second contact configured as a source, and a third contact configured as a gate, the gate of the MEMS switch responsive to the gate activation signal from the control circuitry to facilitate the interruption of an electrical current passing through the current path;
    detection circuitry operatively coupled to the control circuitry and the MEMS switch, the detection circuitry configured to provide synchronization signals to the MEMS switch in response to detection of a zero crossing of a current from a voltage source, and configured to provide an output signal to the control circuitry; and
    a communication connection in signal connection with the control circuitry such that the control circuitry is responsive to the enable logic on the communication connection in logical combination with the output signal from the detection circuitry to control a state of the MEMS switch, the enable logic signal being received from a location spatially displaced from the MEMS switch.

2. The system of claim 1, wherein each communication connection of the plurality of remote operable over-current protection apparatuses is in signal communication with each other.

3. The system of claim 1, wherein each of the plurality of remote operable over-current protection apparatuses further comprises:
an isolation contactor disposed in the current path between the MEMS switch and a load serviced by the current path, the isolation contactor providing an air-gap isolation in combination with the MEMS switch having been responsive to facilitate interruption of the electrical current.

4. A method of remote over-current protection of a current path, comprising:
measuring electrical current via control circuitry arranged integrally with the current path, the control circuitry being configured for providing a gate activation signal;
detecting a logical combination of receipt of an enable logic signal and a detection circuit output signal, the enable logic signal being in the form of a logical-high or a logical-low voltage signal and being representative of a remotely received control signal that enables interruption of the electrical current, the detection circuit output signal being representative of a zero-current crossing condition in the current path;
facilitating interrupting of the electrical current via a MEMS switch comprising a first contact configured as a drain, a second contact configured as a source, and a third contact configured as a gate, the gate of the MEMS switch being responsive to the gate activation signal from the control circuitry, the MEMS switch disposed on the current path; and
changing a state of the MEMS switch based on the detected logical combination of receipt of the enable logic signal and the detection circuit output signal communicated to the control circuitry.

5. The method of claim 4, wherein the facilitating further comprises:
determining, by the control circuitry, if the electrical current meets or exceeds a parameter of a defined trip event; and
in response to determining that the electrical current meets or exceeds the parameter of the defined trip event, making available to the MEMS switch an interruption signal.

6. The method of claim 5, wherein the interrupting further comprises:
in response to the interruption signal being received at the MEMS switch, opening the MEMS switch, thereby facilitating interrupting the electrical current.

7. The method of claim 4, wherein the control circuitry changes the state of the MEMS switch from closed to open in response to the control signal.

8. A remote operable over-current protection apparatus, comprising:
control circuitry integrally arranged on a current path configured to receive an enable logic signal in the form of a logical-high or a logical-low voltage signal, and configured to provide a gate activation signal;
a micro electromechanical system (MEMS) switch disposed on the current path, the MEMS switch comprising a first contact configured as a drain, a second contact configured as a source, and a third contact configured as a gate, the gate of the MEMS switch responsive to the gate activation signal from the control circuitry to facilitate the interruption of an electrical current passing through the current path;
detection circuitry operatively coupled to the control circuitry and the MEMS switch, the detection circuitry configured to provide synchronization signals to the MEMS switch in response to detection of a zero crossing of a current from a voltage source, and configured to provide an output signal to the control circuitry; and
a communication connection in signal connection with the control circuitry such that the control circuitry is responsive to the enable logic on the communication connection in logical combination with the output signal from the detection circuitry to control a state of the MEMS switch, the enable logic signal being received from a location spatially displaced from the MEMS switch.

9. The apparatus of claim 8, wherein the control circuitry is responsive to the electrical current meeting a parameter of a defined trip event to open the MEMS switch.

10. The apparatus of claim 9, wherein the parameter of the defined trip event comprises at least one of time, level of electrical current, or a combination thereof.

11. The apparatus of claim 9, wherein the control circuitry is responsive to the control signal to close the MEMS switch.

12. The apparatus of claim 8, wherein the control circuitry is responsive to the control signal to open the MEMS switch.

13. The apparatus claim 8, further comprising a Hybrid Arcless Limiting Technology (HALT) arc suppression circuit disposed in electrical communication with the MEMS switch to receive a transfer of electrical energy from the MEMS switch in response to the MEMS switch changing state from closed to open.

14. The apparatus of claim 8, further comprising a voltage snubber circuit in parallel connection with the MEMS switch.

15. The apparatus of claim 8, wherein:
the current path is one of a plurality of current paths; and
each current path of the plurality of current paths is integrally arranged with the control circuitry.

16. The apparatus of claim 15, wherein the MEMS switch is one of a plurality of MEMS switches corresponding to the plurality of current paths, each MEMS switch of the plurality of MEMS switches being responsive to the control circuitry to facilitate the interruption of an electrical current passing through a respective one of each of the plurality of current paths.

17. The apparatus of claim 16, wherein the control circuitry is responsive to an electrical current passing through any one of the plurality of current paths meeting a parameter of a defined trip event to facilitate the interruption, via each of the plurality of MEMS switches, of an electrical current passing through each of the plurality of current paths.

18. The apparatus of claim 17, wherein the parameter of the defined trip event comprises at least one of time, level of electrical current, or a combination thereof.

19. The apparatus of claim 8, further comprising:
an isolation contactor disposed in the current path between the MEMS switch and a load serviced by the current path, the isolation contactor providing an air-gap isolation in combination with the MEMS switch having been responsive to facilitate interruption of the electrical current.

* * * * *